US008244471B2

(12) United States Patent
Gunnarshaug (10) Patent No.: US 8,244,471 B2
(45) Date of Patent: Aug. 14, 2012

(54) OILFIELD ANALYSIS SYSTEM AND METHOD

(75) Inventor: Jo Gunnarshaug, Oslo (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 1271 days.

(21) Appl. No.: 11/961,985

(22) Filed: Dec. 20, 2007

(65) Prior Publication Data

US 2008/0161942 A1    Jul. 3, 2008

Related U.S. Application Data

(60) Provisional application No. 60/877,250, filed on Dec. 27, 2006.

(51) Int. Cl.
*G01V 1/40*     (2006.01)
*G01Q 10/00*    (2010.01)

(52) U.S. Cl. .......................................... 702/6; 705/7.11

(58) Field of Classification Search .............. 702/6, 1–2, 702/5, 11–14, 16–17, 81, 84, 182–183, 189; 700/28, 35–36, 213–215, 225; 703/1, 5, 703/10; 705/7.11–7.12, 7.22–7.23, 7.25, 705/7.27, 7.29, 7.36, 7.38, 7.41; 707/790–793, 707/802–803, 809, 812; 719/315–316, 330–332
See application file for complete search history.

(56) References Cited

U.S. PATENT DOCUMENTS

| 5,992,519 | A | 11/1999 | Ramakrishnan et al. |
| 6,178,815 | B1 | 1/2001 | Felling et al. |
| 6,775,578 | B2 | 8/2004 | Couet et al. |
| 6,980,940 | B1 | 12/2005 | Gurpinar et al. |
| 2008/0005155 | A1* | 1/2008 | Soma et al. ............ 707/102 |

FOREIGN PATENT DOCUMENTS

GB    2004/049216 A1    6/2004

OTHER PUBLICATIONS

International Search Report dated Apr. 29, 2008 (3 pages).

* cited by examiner

*Primary Examiner* — Toan M Le
(74) *Attorney, Agent, or Firm* — Lam Nguyen (57) ABSTRACT

A system for analyzing an oilfield having at least one wellsite, each at least one wellsite having a wellbore penetrating a subterranean formation for extracting fluid from an underground reservoir therein, that includes a data collection means for obtaining source data having a plurality of data elements of heterogeneous data types, memory for storing the source data, a functional method configured to perform a function on a dataset of a dataset type to obtain a processed dataset, and a client code configured to process the dataset. The client code includes an object instantiation code configured to use a dataset wrapper class to create the dataset with the dataset type from the source data, and a functional method invocation code configured to call the functional method with the dataset.

22 Claims, 7 Drawing Sheets

ND METHOD

CROSS-REFERENCE TO RELATED APPLICATIONS

This application claims benefit of U.S. Provisional Application Ser. No. 60/877,250 entitled "Oilfield Analysis System and Method," filed on Dec. 27, 2006, in the name of the sole inventor, Jo Gunnarshaug.

BACKGROUND

Oilfield operations involve various sub-activities used to locate and gather valuable hydrocarbons. Various tools, such as seismic tools, are often used to locate the hydrocarbons. One or more wellsites may be positioned along an oilfield to locate and gather the hydrocarbons from subterranean reservoirs of an oilfield. The wellsites are provided with tools capable of advancing into the ground and removing hydrocarbons from the subterranean reservoirs. Production facilities are positioned at surface locations to collect the hydrocarbons from the wellsite(s). Fluid is drawn from the subterranean reservoir(s) and passes to the production facilities via transport mechanisms, such as tubing. Various equipment is positioned about the oilfield to monitor and manipulate the flow of hydrocarbons from the reservoir(s).

During oilfield operations, it is often desirable to monitor various oilfield parameters, such as fluid flow rates, composition, etc. Sensors may be positioned about the oilfield to collect data relating to the wellsite and the processing facility, among others. For example, sensors in the wellbore may monitor fluid composition, sensors located along the flow path may monitor flow rates, and sensors at the processing facility may monitor fluids collected. The monitored data is often used to make real-time decisions at the oilfield. Data collected by these sensors may be further analyzed and processed.

The processed data may be used to determine conditions at the wellsite(s) and/or other portions of the oilfield, and make decisions concerning these activities. Operating parameters, such as wellsite setup, drilling trajectories, flow rates, wellbore pressures, production rates and other parameters, may be adjusted based on the received information. In some cases, known patterns of behavior of various oilfield configurations, geological factors, operating conditions or other parameters may be collected over time to predict future oilfield activities.

Oilfield data is often used to monitor and/or perform various oilfield operations. There are numerous factors that may be considered in operating an oilfield. Thus, the analysis of large quantifies of a wide variety of data is often complex. Over the years, oilfield applications have been developed to assist in processing data. For example, simulators, or other scientific applications, have been developed to take large amounts of oilfield data and to model various oilfield activities. Typically, there are different types of simulators for different purposes. Examples of these simulators are described in patent/Application Nos. U.S. Pat. No. 5,992,519, WO2004/049216, and U.S. Pat. No. 6,980,940.

Numerous oilfield operations, such as drilling, evaluating, completing, monitoring, producing, simulating, reporting, etc., may be performed. Typically, each oilfield activity is performed and controlled separately using separate oilfield applications that are each written for a single purpose. Thus, many such operations are often performed using separate oilfield applications. In some cases, it may be necessary to develop special applications, or modify existing applications to provide the necessary functionality.

Some applications specialize in analyzing and providing a visualization of large datasets. A dataset is a group of data elements. For example, a dataset may correspond to a collection of data elements obtained from sensory data. Specifically, when identifying a possible area for oilfield exploration, seismic data representing rock and soil densities may be collected from sample points in a geological area. By interpolation, a dataset may be derived for the entire geological area. An oilfield application may be used to visualize the dataset in the entire region. Based on the visualization, a decision maker may determine whether to perform further planning and exploration of the geological area.

Typically, for an oilfield application to process the dataset, the oilfield application opens the file having the dataset and iterates through each data element in the dataset to process each data element. To iterate through the application, knowledge of the layout of the dataset in memory is used by the programmer to improve performance. For example, if the dataset is organized such that data elements in the same row are next to each other in memory and data elements in the same column are not next to each other, then it may be advantageous to iterate through the data elements in each row before switching to the next column. The iteration and processing may be performed multiple times throughout the application. Thus, when the layout of the dataset in memory changes, the oilfield application is redesigned and recompiled for the new dataset.

SUMMARY

In general, in one aspect, the invention relates to a system for analyzing an oilfield having at least one wellsite, each at least one wellsite having a wellbore penetrating a subterranean formation for extracting fluid from an underground reservoir therein, that includes a data collection means for obtaining source data having a plurality of data elements of heterogeneous data types, memory for storing the source data, a functional method configured to perform a function on a dataset of a dataset type to obtain a processed dataset, and a client code configured to process the dataset. The client code includes an object instantiation code configured to use a dataset wrapper class to create the dataset with the dataset type from the source data, and a functional method invocation code configured to call the functional method with the dataset.

In general, in one aspect, the invention relates to a method for analyzing an oilfield that includes defining a functional method for operating on a dataset of a dataset type, obtaining source data having a first source data with data elements of a first data type and a second source data with data elements of a second data type, creating the dataset with data elements from the first source data using a dataset wrapper class, executing the functional method on the dataset with data elements from the first source data, creating the dataset with data elements from the second source data using a dataset wrapper class, and executing the functional method on the dataset with data elements from the second source data.

In general, in one aspect, the invention relates to a computer system that includes a processor, memory coupled to the processor for storing source data having a plurality of data elements of heterogeneous data types, a dataset wrapper class that includes an object constructor code configured to create a dataset of a dataset type from the source data, and client code configured to process the dataset that includes an object instantiation code configured to use the object constructor code to create the dataset, and a functional method invocation code configured to call a functional method with the dataset to obtain processed data.

In general, in one aspect, the invention relates to a system for analyzing an oilfield having at least one wellsite, each at least one wellsite having a wellbore penetrating a subterranean formation for extracting fluid from an underground reservoir therein, that includes a data collection means for obtaining a dataset having a plurality of data elements, memory for storing the dataset, a client code configured to process the dataset with a dataset type wrapper class. The client code includes an object constructor code configured to create an object to reference the dataset of a dataset type, and a functional method configured to traverse the dataset based on a memory layout using an iterator and individually perform a function on each data element in the dataset to obtain a processed dataset.

In general, in one aspect, the invention relates to a method for analyzing an oilfield having at least one wellsite for extracting fluid from an underground reservoir therein, that includes obtaining a dataset having a first client dataset and a second client dataset, creating a client code for operating the dataset, that includes object instantiation code having instructions for instantiating an object to reference the dataset, and functional method invocation code having instructions for manipulating the dataset by calling a functional method defined in a wrapper class on the object that traverses the first client dataset based on a first memory layout and individually performs a function on each data element in the first client dataset, and traverses the second client dataset based on a second method layout and individually performs the function on each data element in the second client dataset, compiling the functional method invocation code such that recompiling the functional method invocation code is not required, executing the client code on the first client dataset having the first memory layout, and executing the client code on a second client dataset having the second memory layout.

In general, in one aspect, the invention relates to a computer system that includes a processor, memory coupled to the processor for storing a dataset having a plurality of data elements, a dataset type wrapper class that includes an object constructor code configured to create an object to reference the dataset of a dataset type, and a functional method that includes instructions for identifying an iterator to traverse the dataset based on a memory layout of the plurality of data elements, and processing the dataset using the iterator to obtain a processed dataset, and a client code configured to process the dataset by instantiating the object with the object constructor code and obtain a processed dataset by calling a functional method on the object.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of aspects of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for analyzing an oilfield. These methods and systems involve techniques involving generating an application. Specifically, these techniques have a wrapper class that may be used in an application (e.g., oilfield application) to create a single object of a dataset. The data in the dataset may be derived from and represent a variety of source data. The wrapper class includes functionality to iterate through the source data, cache portions of the source data, and manipulate the source data using the dataset. By using a wrapper class, functional methods which operate on the dataset may be designed and compiled once without requiring additional recompilation. Further, when the dataset is defined in a header file of an application, applications which use the dataset may be designed and compiled once. This is possible regardless of the layout of the data. The data elements may be saved in a cache for quick access to the data. Data elements may be modified and saved in the cache intelligently to improve performance. For example, the layout of the data elements in the cache may change from the layout of the data elements in memory.

Figure 1:
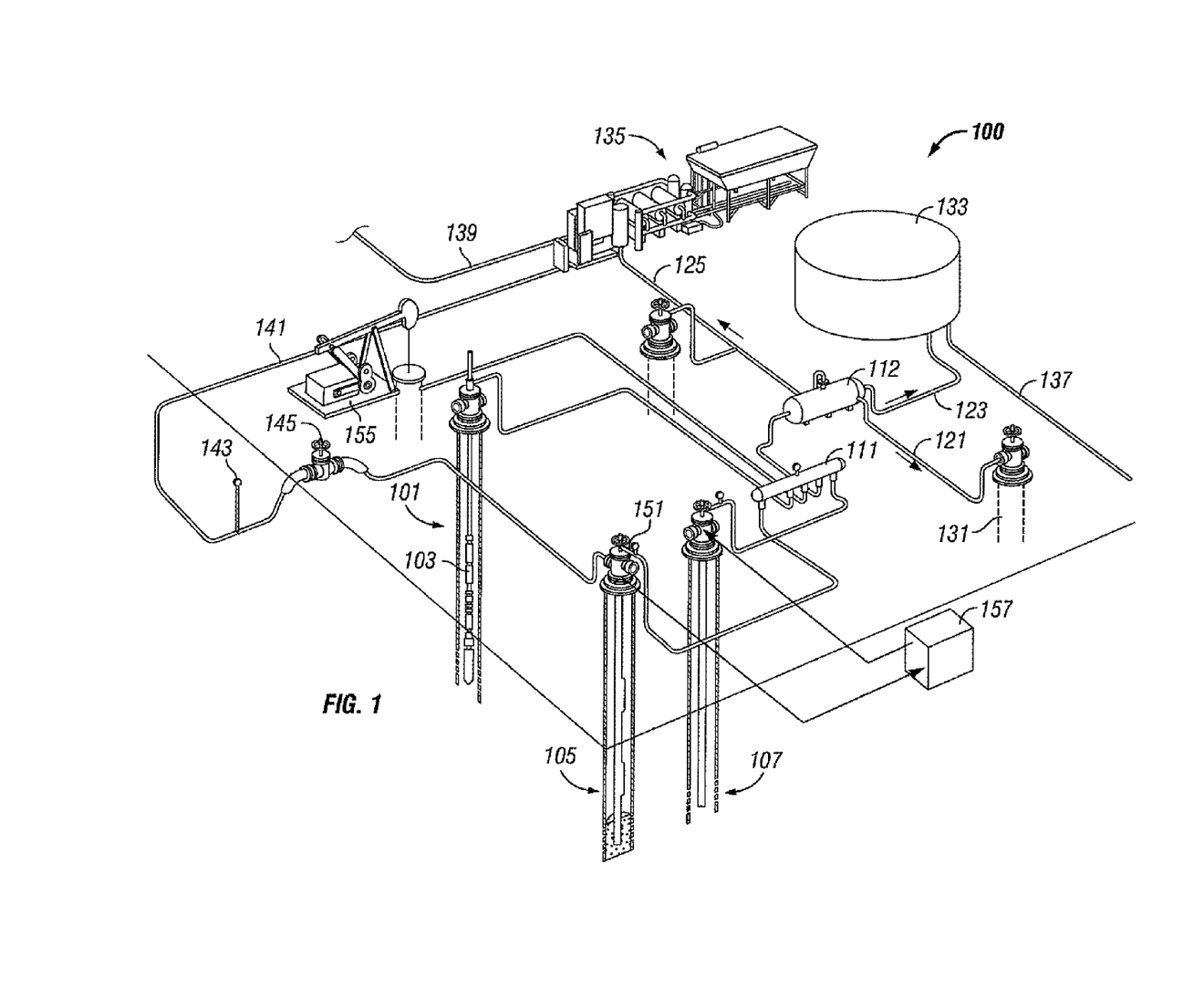
FIGS. 1-3 depict an overview of an example containing various aspects of an oilfield and related oilfield operations useful in the oil and gas industry.
Figure 2:
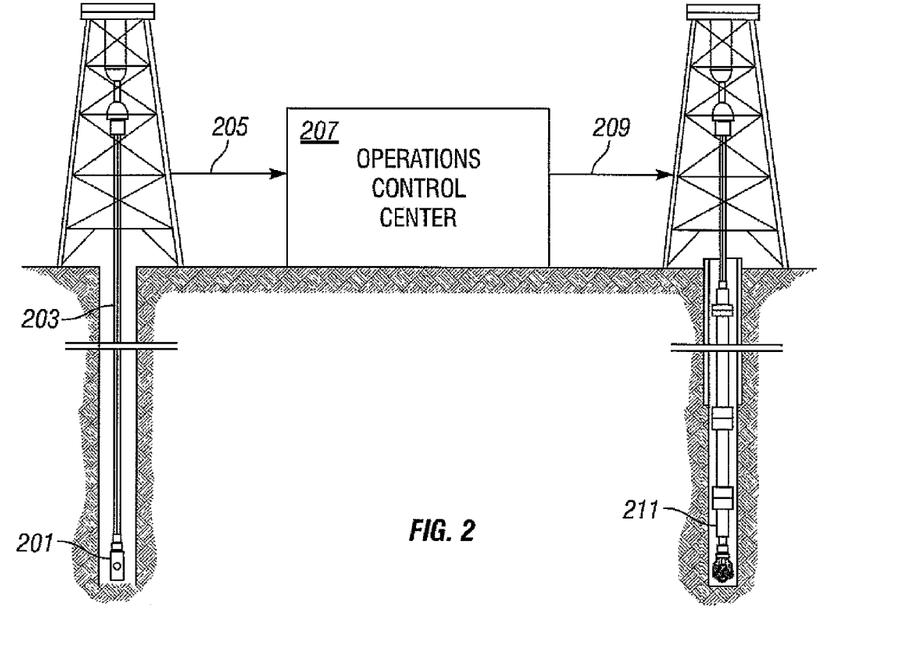
Figure 3:
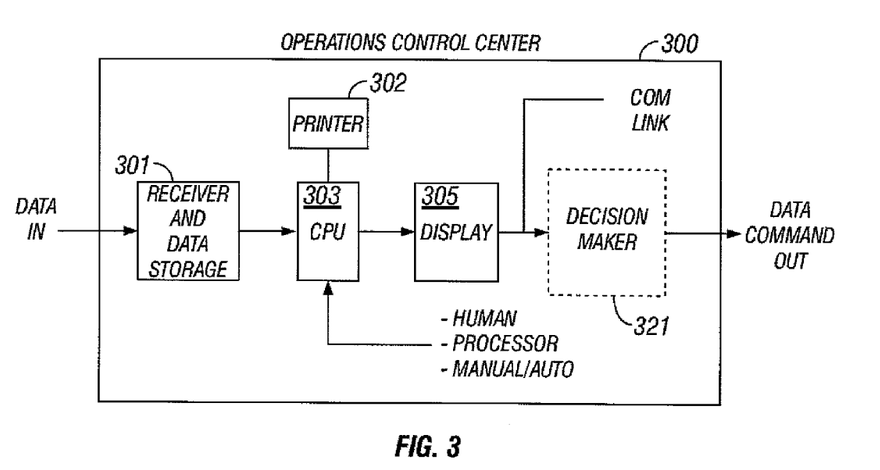

Further, various applications may be generated for any number of industries. One such industry is the oil and gas industry. FIGS. 1-3 depict an overview of an example of an oilfield involving various oilfield operations typically used in the oil and gas industry. Briefly, an oilfield operation may take many forms including operations performed before any drilling occurs, such as, for example, exploration, analysis, etc. In addition, an oilfield activity may include activities occurring after drilling, for example, well work over, completions, production and intervention, as well as storage, transport, and refining of hydrocarbons. Furthermore, an oilfield activity may also include activities performed during drilling.

Turning to FIG. 1, an oilfield (100) is depicted having machinery used to extract hydrocarbons, such as oil and gas, from down-hole formations. An operations control center (157) may assist in collecting data and making decisions to enhance operations in the oilfield. Data such as measurements of bottom hole pressure and tubing head pressure may be gathered from the oilfield and analyzed.

As shown in FIG. 1, the oilfield (100) includes a number of wells. Specifically, the oilfield (100) include first producing well (101), which uses an electric submersible pump (103) to produce a hydrocarbon (e.g., oil, gas, etc.); a second well (105), which relies on a gas lift to produce a hydrocarbon; and a third well (107), which produces a hydrocarbon on the basis of natural flow. First producing well (101), second well (105), and third well (107) deliver production fluids (e.g., hydrocarbon produced from their respective wells) to a production manifold (111). The production manifold collects multiple streams and outputs the streams to a gas and oil separator (112).

Upon receipt of the production fluids by the gas and oil separator (112), the gas and oil separator (112) separates various components from the fluids, such as produced water (121), produced oil (123), and produced gas (125), respectively, to water disposal well (131), oil storage (133), and a compressor station (135). Oil storage (133) may transfer oil via an oil export pipeline (137). Similarly, the compressor station (135) may use gas export pipeline (139) to transfer gas. Finally, the compressor station (135) may process gas as an injection gas (141).

In order to adjust pressure on the injection gas, a meter and control system (143) may cooperate with an injection-gas manifold (145). The operation of the meter and control system (143) may regulate pressure of the injection gas as the injection gas is delivered to a wellhead tubing and casing (151). In addition to the injection gas, extracting efforts may rely upon a rod pump (155) to drive a downhole pump assembly via a reciprocating motion. In such cases, the rod pump (155) propels hydrocarbons to the production manifold (111).

In one example, the operations control center (157) may receive data from sensors positioned throughout the oilfield. Examples of sensors are depicted and described in further detail with respect to FIG. 2 and described further below. The operations control center (157) may also operate and/or control equipment in the third well (107).

FIG. 2 shows a portion of the wellbore operation, such as the wellbore operation of FIG. 1, in greater detail. This diagram depicts the cooperation of the operations control center (207) with at least two wells. As discussed above, a purpose of the operations control center (207) is to collect data and control a drilling operation. The down-hole sensors (201) and well-head sensors (203) provide data (i.e., data collected and/or otherwise obtained from the down-hole sensors (201) and/or the well-head sensors (203)). Upon receipt of the information, a first communication link (205) transfers the aforementioned data to the operations control center (207). Data may also be collected from other sources, and/or sent to other sites (not depicted). Such data may be historical, real time, or stored data.

The operations control center (207) stores and, in some cases, optionally processes and/or analyzes the data. In some cases, the operations control center (207) may also generate and transmit control signals via the second communication link (209) to a down-hole apparatus (211). For example, the operations control center (207) may automatically generate control signals using data obtained via communications link (205). In another example, the operations control center (207) may provide information to an operator that may consider the information, and then send control signals as desired. In addition, the operations control center (207) may also provide feedback to down-hole sensors (201) and/or well-head sensors (203) using data obtained via communications link (205).

FIG. 3 shows an operations control center (300) that may be used with the oilfield operations of FIGS. 1 and 2. A receiver and data storage (301) corresponds to a device configured to receive and store data, for example, from a sensor (i.e., (201, 203) of FIG. 2) or other components internal and/or external to the operations control center (300). Receiver and data storage (301) may be implemented, for example, using a magnetic storage device, an optical storage device, a NAND storage device, any combination thereof, etc.

A CPU (303) (e.g., a microprocessor) is configured to process data (e.g., data stored in the receiver and data storage (301)), to store processed data and/or generate commands to operate various oilfield components shown in FIGS. 1 and 2. In addition, the CPU (303) may operate output devices such as a printer (302), for example, to print out a questionnaire for collecting opinions. The CPU (303) may also operate a display device (305) (e.g., a monitor, etc). A decision-maker (321) may optionally contribute to selecting a work element for enhancing. For example, the decision-maker (321) may operate a keyboard or mouse (not shown) to register estimates (discussed below). The CPU (303) may also store such estimates or rated elements (discussed below) to the receiver and data storage (301).

An operations control center may use a data processing system including various components, such as those depicted in FIG. 3. These components may be, for example, the communication unit (i.e., receiver and data storage (301)), central processing unit (i.e., CPU (303)), and memory (i.e., receiver and data storage (301)) all of which may be operatively connected via a bus. The memory is preferably configured to store one or more sets of instructions. Further, the CPU (303) (e.g., a microprocessor) is preferably configured to execute one or more of the sets of instructions to control, for example, the operation of the third well (107 in FIG. 1). Finally, the communication unit preferably operates as an interface between the operations control center (157) and the other oilfield operations components. As such, the communications interface may be configured to receive data from the oilfield operations components and to send commands and/or data to the oilfield operations components.

Figure 4:
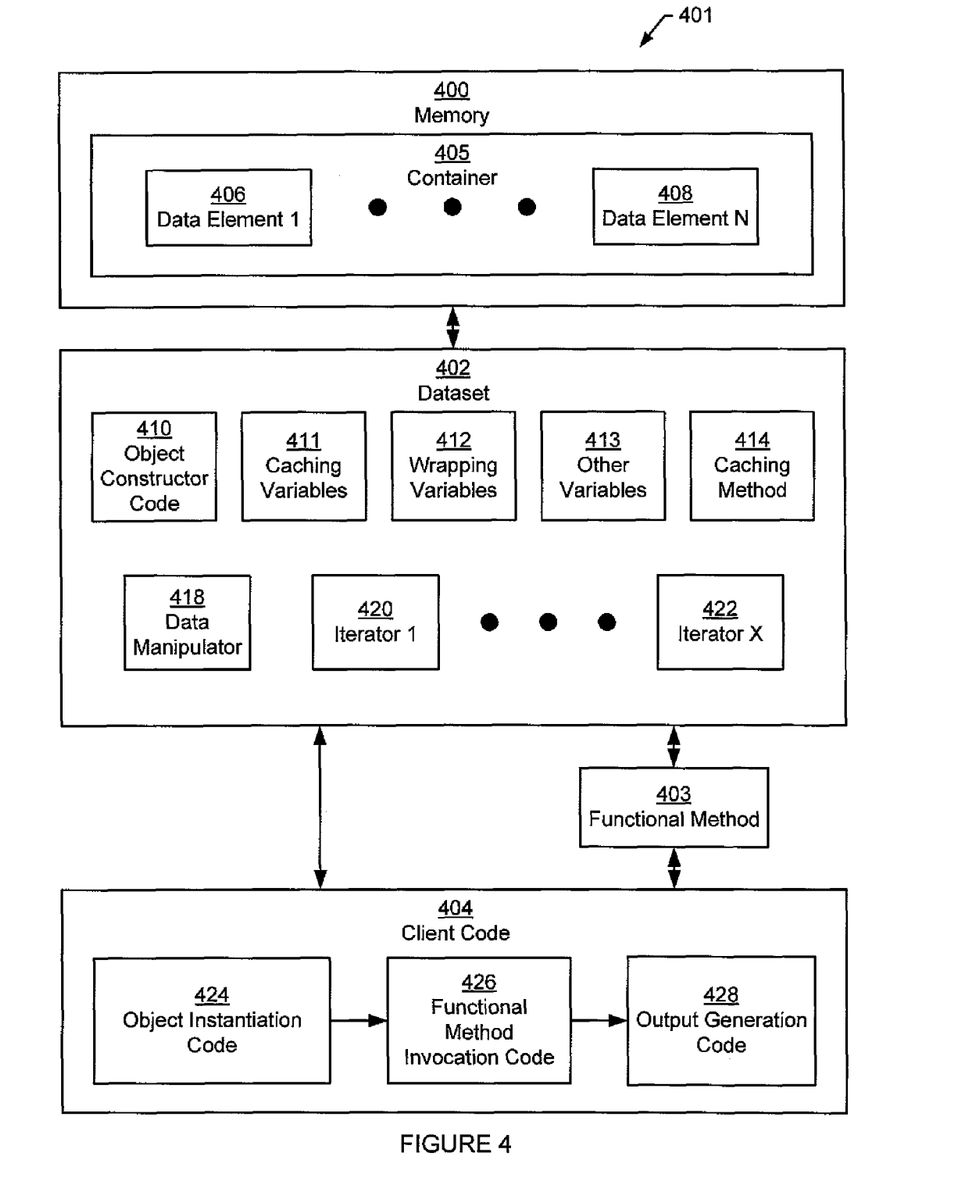
FIG. 4 shows a schematic diagram of a system for analyzing an oilfield, such as the oilfield depicted in FIGS. 1-3.

FIG. 4 shows a schematic diagram of a system (401) for analyzing, for example, an oilfield. As shown in FIG. 4, the system includes memory (400), a dataset (402), a functional method (403), and client code (404). Each of these components is described below.

Memory (400) is a storage mechanism for storing data. For example, memory (400) may correspond to random access memory, read only memory, hard disks, flash drive, etc. Memory (400) includes functionality to store one or more containers (405). The containers (405) may include, for example, data collected from sensors positioned about the oilfield, such as sensors 201 and 203 of FIG. 2.

A container (405) may be a mechanism for identifying a collection of interrelated data elements (e.g., data element 1 (406) and data element n (408)). Specifically, a container (405) provides a structure on the data elements (e.g., data element 1 (406) and data element n (408)). Thus, a container (405) may be used to enforce a particular memory layout for contained data elements (e.g., data element 1 (406) and data element n (408)). The data elements are source data for the container. The data elements in the container have an organization in memory. For example, the container may be a linked list, or the data elements may be organized in row major order, column major order, etc. A container (405) may be n-dimensional by supporting n-dimensional indexing. The number of data elements (e.g., data element 1 (406) and data element n (408)) in any dimension of the n dimensions may or may not be heterogeneous. For example, a first row and column may have a height of twelve data elements while another row and column has a height of fifteen data elements.

The data elements (e.g., data element 1 (406) and data element n (408)) in a container (405) may correspond to meteorological data, seismic data, etc. A sensor may collect the data for the container (405). For example, a sensor may collect one or more data elements representing rock and soil densities for a point in a geological area. An operations control center may identify the rock and soil densities for the entire geological area by coordinating one or more sensors to collect data elements for several points. For example, using statistical techniques such as interpolation, data elements representing the entire geographical area may be represented in the container.

Each data element has a data type. The data type may be, for example, an integer, a float, a double, a vertex2, a vertex3, a tuple, a user-defined datatype, or any other data type. A vertex2 is an ordered pair of two doubles. A vertex3 is an ordered set of three doubles. Typically, the data types of data elements (e.g., data element 1 (406) and data element n (408)) in the container (405) are homogeneous throughout the container (405). Specifically, each data element in the container (405) may have the same data type.

A dataset (402) may be a virtual container class for data elements. The specific data type of the dataset may be referred to as a dataset type. For example, the dataset (402) may be designed for and may subsequently have a dataset type of an integer set, a float set, a double set, a vertex2 set, vertex3 set, tuple set, record set, user-defined data type set, etc. The dataset type is the type of the data elements in the dataset. The data elements in the dataset may be the data elements in the source data or may be derived from data elements in the source data. For example, consider the scenario in which a container has data elements of type Vertex3. In the example, a Vertex2Set dataset may be created from container by wrapping the source data to hide one of the three doubles in the ordered set of doubles for each data element in the container. Thus, the resulting Vertex2Set dataset has data elements of type Vertex2 which are derived from Vertex3 data elements in the container.

Furthermore, a dataset may correspond to a proxy for any combination of container(s) and other dataset(s) with transformations. Thus, a dataset may have source data (i.e., data elements in the container(s) and/or other dataset(s)) which has heterogeneous data types. For example, the data type of data elements in two different containers which are used to create a dataset may be different. Similar to a container (402), a dataset (405) may be interpreted as an n-dimensional image or volume by supporting n-dimensional indexing on the data elements of the dataset.

Moreover, a dataset (402) corresponds to a wrapper class designed for a specific dataset type. Specifically, a dataset (402) is a definition of an object of a dataset type and functions that act on the object. An object includes a reference to a container (405). An object is a description of the container (405) and includes information necessary to access the data elements (e.g., data element 1 (406), data element n (408)) in a container (405). Additionally, a dataset may also refer to one or more other dataset(s). Thus, a hierarchy of datasets may exist in which datasets in the hierarchy may directly or indirectly refer to the same container classes. A dataset (402) includes, as components, an object constructor code (410), wrapping variables (411), caching variables (411), other variables (413), caching methods (414), a data manipulator (418), and iterators (e.g., iterator 1(420), iterator X (422)). Each of the components of the dataset (402) is described below.

Object constructor code (410) corresponds to the method to create an object of the dataset type. In some examples, an Application Programming Interface (API) for an object constructor code (410) specifies that the input parameters include the location of the container (405). The location of the container (405) may be, for example, a file location of the source data in the container, the name of the source data in the container, etc. Further, multiple object constructor codes may exist for a single dataset type. Each of the multiple object constructor codes may be designed for different types of source containers. For example, for a Vertex2set dataset, an object constructor code which has as parameters double vectors may exist as well as an object constructor code which has as parameters a Vertex3set and an integer identifying the portion of a Vertex3 data element to ignore. Moreover, an object constructor code may exist for each combination of containers and datasets which may be used to create a dataset of the dataset type.

In addition to object constructor code (410), the dataset (402) includes caching variables (411), wrapping variables (412), and other variables (413). Caching variables (411) correspond to variables related to caching the data elements (e.g., data element 1 (406) and data element n (408)) in container (405). A cache (not shown) is a temporary storage area for the data elements (e.g., data element 1 (406) and data element n (408)) in a container (405). The cache can automatically be set up so that the CPU-cache(s) are better utilized. For example, the cache can include a set of software cache-blocks, which fit perfectly to the central processing unit's cache blocks with regard to memory position or size. The caching variables (411) may include, for example, a cache mode, the actual cache, a touch vector, and cache usage statistics. The cache mode (i.e., mode of the cache) identifies whether to cache the container (405). Specifically, the cache mode may have the values of "off," "all," "window," and "random." Each of the cache modes is described below.

A cache mode corresponding to "off" may be used when the data elements in the dataset are not to be cached. The cache mode may be off when there are no transformations and the dataset can wrap the source data. Specifically, being able to wrap the source data may include being able to return a value by reference. A cache mode corresponding to "all" is for when all data elements in the dataset are cached. The cache mode is set to "all" when the cache is needed and the size of the data set is small enough to fit in the cache.

A cache mode corresponding to "window" may be used when only a portion of the dataset is in the cache. In such scenario, the cache is considered "window" when the size of the dataset is large. The dataset can be in mode "window" when data is accessed with multiple forward/backward iterators. Then the cache may include multiple windows in which each window corresponds to a different sub-part of the dataset. Finally, the cache mode may be set to "random" when the cache is needed, the size of the dataset is large, and data elements in the dataset are accessed randomly (i.e., when the data set is accessed using a random access iterator). In "random" mode, a set of previously requested values may be cached together with associated indices of the data elements.

When the cache is active (i.e., when the cache is not "off"), the cache may be invalidated or flushed, implicitly or automatically by the dataset. For example, the cache may be invalidated implicitly if the transformation in the dataset changes. Implicitly flushing the cache may be performed directly before the cache has refilled and when the dataset is destructed. Further, the cache may be explicitly flushed in the client code (404) (described below). For example, if the client code changes the source data of the dataset without using the dataset, then the client code may also explicitly flush the cache.

Continuing with the caching variables, the actual cache may be used as a reference to a memory structure having the cache. A touch vector may be used to specify which portions of cache is affected when the source data of the portion has changed. For example, the touch vector may be used when the client code changes the source data. Additionally, cache usage statistics may include information regarding how often the cache is accessed for the container (405), the last access to the cache for the container (405), the amount of memory used for the cache, the data elements in the cache that have been modified, etc.

Continuing with the variables, wrapping variables (412) are variables that may be used to describe how to wrap the source data. A dataset may be able to wrap source data having a specific memory layout without caching the source data. In order to wrap source data, wrapping variables may include a wrap mode, data pointer, size vector, and an offset vector. A data pointer is a reference to the source data. Specifically, a data pointer may reference the first data element of the source data. The size vector and the offset vector may have one value for each dimension of an n-dimensional data set. The size vector may specify the number of data elements along each dimension. For example, the $i^{th}$ position of the size vector may specify the number of data elements along the $i^{th}$ dimension. The offset vector specifies the distance in memory between two adjacent elements along each dimension. For example, the $j^{th}$ position of the offset vector may specifies the distance between the adjacent elements on the $j^{th}$ dimension.

For example, consider the scenario in which the memory layout is of a table with two dimensions (rows and columns). The first dimension represents the rows and has a size of twelve. The second dimension represents columns and has a size of three. Thus, the size vector may have the values (twelve, three). Further, in the example, consider the scenario in which adjacent elements in each row are next to each other in memory and each row is represented in memory sequentially. Thus, distance between adjacent elements in the columns is the size of the row*the size of each data element). In such scenario, the offset vector may have values (size of data element, twelve*size of each data element).

Thus, the wrapping variables may be used by the wrapper class to represent the memory layout of a vector container, the memory layout in which the same value is used for the entire area (e.g., the data pointer may point to a single value in memory and the offset vector may have values of zero), a memory layout in which the number of dimensions of the source data is less than the number of dimension of the dataset, a memory layout in which the data type of the source data is reinterpreted (e.g., changing from a vertex 3 set to a vertex 2 set), a memory layout in which the source data is sub-sampled (e.g., every second data element is considered), and a memory layout in which the source data is cropped. The cache may be used to represent the memory layout of a linked list, a transformed dataset, or when the source data has different data types than the dataset, such as when the source data has a vector of integers and the dataset should consist of doubles.

Other variables (413) may be used for describing the dataset. Other variables (413) may include a coordinate system, iterator references, and transformation references. The coordinate system specifies the measurement unit (e.g., meters, points, inches, miles, etc.) of the values of the data elements in the cache and data elements (e.g., data element 1 (406), data element n (408)) in the container (405). The coordinate system variables also make it possible to use coordinate system abstractions in the client code. Iterator references correspond to a manner for referencing an iterator (defined below). For example, an iterator reference may be used to define an iterator to iterate through the data elements (e.g., data element 1 (406), data element n (408)) in a container (405). Similarly, a transformation reference corresponds to manner for transforming the data elements (e.g., data element 1 (406), data element n (408)).

Continuing with the dataset (402), a caching method (414) includes functionality to manage the cache. Specifically, a caching method (414) includes functionality to access the cache, fill the cache with data elements that may or may not be processed. Further, a caching method includes functionality to flush the cache. Flushing the cache corresponds to removing one or more data elements from the cache. Flushing the cache may be performed after writing any possible modified cache entries back to the source data in memory if not previously done. For example, when a write-through cache is used, then writing modified cache entries may not be required when flushing the cache.

In addition to functions related to caching, the dataset (402) may also include one or more iterators (e.g., iterator 1 type (420), iterator type x (422)) and a data manipulator (418). An iterator (e.g., iterator 1 (420), iterator x (422)) includes functionality to iterate through the dataset (402), while the dataset (402) includes functionality to detect the layout of the container (405) in memory. The iterator (e.g., iterator 1 (420), iterator x (422)) may use this information, for example, when iterating to the next data element. The iterator types may correspond to a forward iterator, a backward iterator, a bidirectional iterator, and a random access iterator. A forward iterator includes functionality to iterate to the next data element according to the memory location in the dataset. A backward iterator includes functionality to iterate backward through the dataset. A bidirectional iterator includes functionality to iterate forward or backward through the dataset. A random access iterator includes functionality to obtain a specified data element.

A data manipulator (418) includes functionality to modify data elements in the container (405). Multiple types of data manipulators may exist. For example, a data manipulator may include functionality to transform the data into a different coordinate system (e.g., from data elements representing meters in a geological area to data elements representing points on a screen), filter the data, change the values of the data, etc. The data manipulator may change according to the type of application. For example, an oilfield application may require a transformation data manipulator while a hydrological modeling application may require a data manipulator that includes functionality to update specific values of the data elements.

Although FIG. 4 shows a single class for the dataset (402), one or more of the methods may be part of a different class. For example, the iterators, caching methods, etc. may be defined in separate classes. Further, in other cases, the interface for the functionality provided by the dataset (402) is the same regardless of the dataset type. Specifically, when multiple dataset type exist, a dataset may exist that have the same API for each the multiple dataset types. For example, the same functionality provided by the data manipulators may exist for each of the datasets. Further, accessing the functionality may be the same regardless of the dataset. In particular, the functionality may be accessed using the same API (e.g., names and input/output parameters of the functional methods) regardless of the dataset.

Continuing with FIG. 4, the system may also include one or more functional methods (403). The functional method (403) may correspond to methods for performing operations on the dataset. For example, the functional method (403) may be used to perform seismic modeling using the dataset, perform a statistical analysis on the dataset, interpolate the dataset, display the dataset, or perform virtually any operation. The functional method may be designed and compiled with a specific iterator (e.g., iterator 1 type (420), iterator type x (422)). The functional method may have an input parameter of the dataset and may require the data elements in the dataset to have a specific dataset type. Because of the ability of the dataset to wrap the source data, which may be of heterogeneous dataset types, so as to appear as a single homogenous dataset type. The requirements of the input parameters of the functional method are complied with by the wrapped dataset.

The functional method (403) may be used by client code (404). Client code (404) is a code for a specific application. For example, the client code (404) may include functionality to provide a visualization of the dataset in an oilfield application. Client code (404) includes object instantiation code (424), functional method invocation code (426), and output generation code (428).

Object instantiation code (424) is code for creating an object to represent a dataset. Specifically, object instantiation code may include an instruction to declare an new dataset and an instruction to initialize the new dataset. For example, the object instantiation code may include code for declaring a new dataset, such as: "private: DoubleSet myObject;" in which "double" is the name for the wrapper class. The instruction to initialize the new dataset uses the object constructor code (410) of the dataset (402). Thus, the instruction to initialize the new dataset of the object instantiation code (424) is dependent on the dataset type of the container (405). Specifically, the object instantiation code may include a reference to a particular constructor code in the dataset for identifying the source data and the data type(s) of data elements in the source data. For example, the object instantiation code (424) may specify that the ordered pair of a Vertex2Set dataset is created from two separate containers of data elements each representing a portion of a Vertex2 data element. In the example, the object instantiation code may have "private: DoubleVector xValues, yValues; Vertex2Set myObject= (xValues, yValues);".

In addition to the object instantiation code (424), the client code (404) may also include functional method invocation code (426). Functional method invocation code (426) is a portion of client code (404) used to manipulate data elements (e.g., data element 1 (406) and data element n (408)) in the container (405). Specifically, functional method invocation code is used to call the functional method (403) on the dataset. Further, because the dataset wrapper class may be used to hide the data types of the source data, the functional method invocation code (426) is not dependent on the data type of the source data. Alternatively, the functional method can be used to re-interpret the container data. For example, a transformation may be required to display a set of data points. In the example, it may be further desired not to permanently change the actual data. Thus, the functional method may be used to perform the transformation without changing the actual data points.

Because the interface of an algorithm (i.e., functional method (403)) is written by using dataset(s) (i.e., by passing references to dataset(s) in the function) and that the algorithm code is compiled using one or more of the iterator(s) (e.g., iterator 1 (420), iterator x (422)), then the interface and compiled code can remain unchanged even when object instantiation code (424) changes. For example, a container may change, the dataset type may change, and a filtering operation can be added, etc. without changing the functional method. Two options may be used for the interface of an algorithm. The choice of the two options is dependant on whether the dataset type is specified.

The first option is for the interface to use dataset(s) that are dataset type specific (e.g., 'DoubleSet'), and compiled code only for the specific dataset type. In such scenario, then the functional method invocation code (426) adds a casting operation (e.g., when the container type does not match the dataset type). Adding the casting operation typically may be done implicitly by using the dataset's object constructor code (410), which simplifies the client code.

A second option is for the interface to use a dataset that is not dataset type specific. In such scenario, the algorithm may include additional logic for handling the actual dataset types. For example, the algorithm may include compiled code for several dataset types (e.g., both float and double). In the example, the algorithm may further have logic to call the most appropriate version and perform type conversions, if necessary.

Continuing with FIG. 4, the client code (404) also includes output generation code (428). Output generation code (428) corresponds to code for transferring the manipulated dataset (e.g., to memory, to another computer, etc.), generating a visualization of the dataset on the screen, etc. Output generation code (428) may be a part of the functional method invocation code, may be a call to a different functional method (not shown), or may have the operations within the client code.

While FIG. 4 shows a single functional method invocation code (426) and output generation code (428), the functional method invocation code and/or output generation code may be distributed throughout the client code (404) to implement one or more functional methods multiple times and/or create different types of output. For example, the client code may be divided into classes. Each class may have functional method invocation code and/or output generation code. Further, the client code may have a single object instantiation code (424) to create a single object which is common to all classes that have a functional method invocation code. Thus, the dataset (402) may track the iterators (e.g., iterator 1 (420), iterator X (422)) that are required by the functional method invocation code (426) in the classes for accessing a single dataset and optimize cache usage accordingly.

Figure 5:
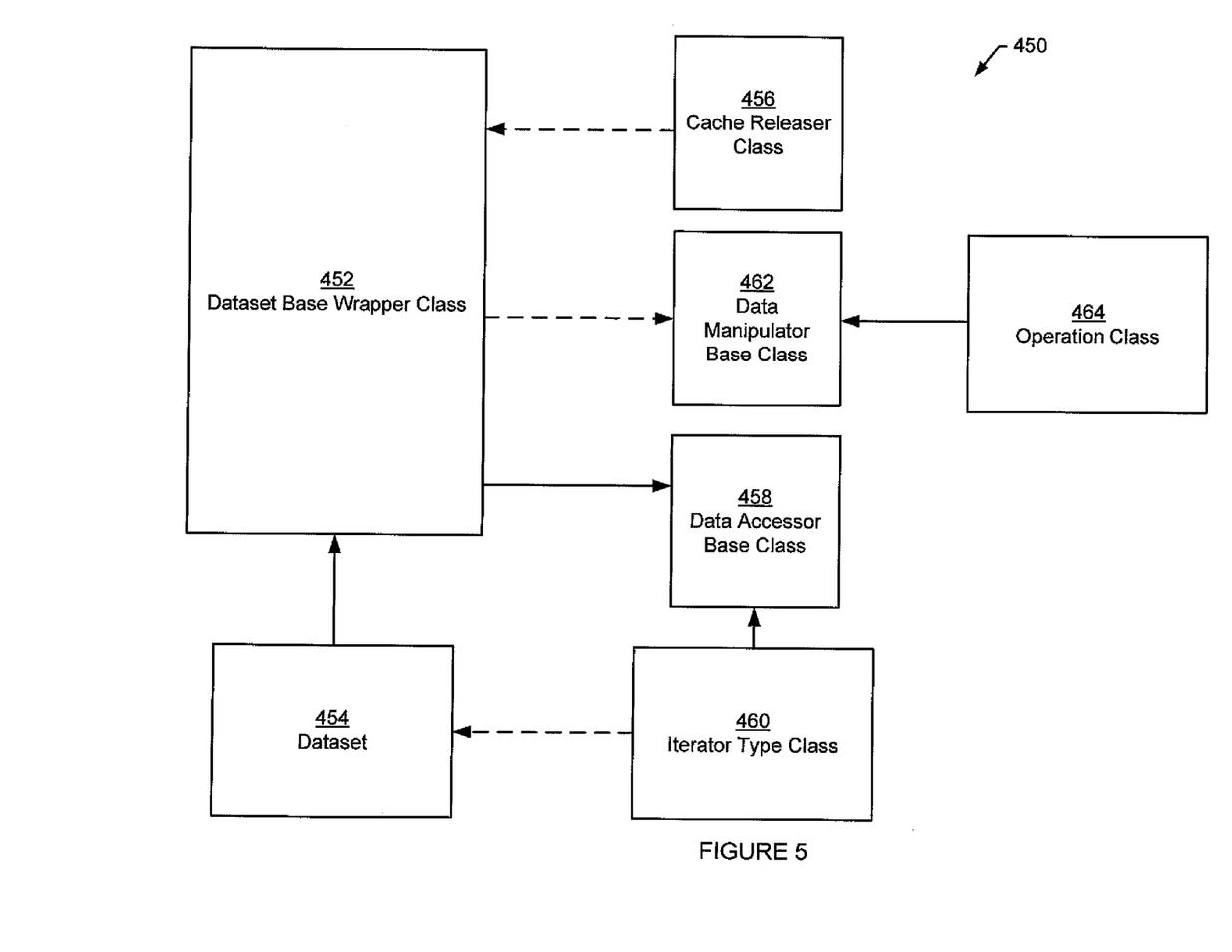
FIG. 5 shows an example software model for implementing a dataset.

FIG. 5 shows an example software model (450) for implementing a dataset (454). As shown in FIG. 5, each dataset (454) may inherit from the same dataset base wrapper class (452). Specifically, the dataset base wrapper class (452) may correspond to an abstract class. The dataset base wrapper class (452) may include functionality that is common to all datasets (454). For example, the dataset base wrapper class (452) may include definitions of caching variables, caching methods, references to data accessors and to data manipulators (described below).

A dataset (454) may inherent from and extend the functionality provided by the dataset base wrapper class (452). Additionally, the dataset (454) may include a reference to an iterator type class (460). Specifically, the dataset may track which iterators are used to access a dataset type. By having references to the instantiated iterators, an instantiated object of a dataset type can optimize cache usage because the instantiated object contains information about how the dataset is accessed.

An iterator type class (460) is used to create an iterator of a specific iterator type (e.g., forward, backward, bidirectional, random, etc.). An iterator type class (460) is defined for each iterator type. For example, an iterator type class (460) for a forward iterator may include variables for tracking the current data element and functions to obtain the first data element in the dataset, the next data element in the dataset, the current data element, etc. An iterator class for implementing a bidirectional iterator may inherit from the forward iterator and extend the functionality to include a function for obtaining a previous data element in the dataset. An iterator class for implementing a random iterator may include functions for receiving index values and obtaining a data element at the index from the dataset. Alternatively, an iterator type class (460) may be defined for each combination of iterator type and dataset type.

An iterator type class (460) may inherit from a data accessor base class (458). The data accessor class (458) corresponds to an abstract class that includes definitions common to each iterator type class (460). For example, a data accessor class may include a definition for referencing a dataset. The dataset class (452) may have pointers all data accessor base classes that may access the dataset class (452).

In addition to data accessor base class (458) and the dataset base wrapper class (452), a data manipulator base class (462) may also be implemented as an abstract class. A data manipulator base class (462) may exist for each type of data manipulation. For example, separate data manipulator base classes may exist for transforming each data element and for performing aggregation operations on multiple data elements (e.g., summing elements in the dataset, averaging elements in the dataset, etc.). Further, a separate data manipulator base class (462) may exist for each dataset type.

An operation class (464) may inherit from the data manipulation base class (462). The operation class (464) corresponds to a class for a specific operation to manipulate the dataset. For example, an operation class (464) may exist to filter data elements, to perform a geometric transformation of the data elements, etc.

Specifically, the methods and operations performed on any dataset may be the same regardless of the dataset type. Moreover, caching operations may be performed by the dataset. Further, FIG. 5 shows a schematic diagram for an interrelationship between dataset (454), iterators (460), and data manipulators (462).

Continuing with FIG. 5, a dataset base wrapper class (452) may be referenced by a cache releaser class (456). The cache releaser class (456) includes functionality to monitor cache usage and release the use of the cache to optimize the use of the cache. For example, if the cache is populated with data from multiple datasets, then releasing cache space occupied by a minimally accessed dataset in favor of a dataset that is accessed more often may provide greater performance. An instantiation of the cache releaser class (456) may be global to a program and/or to the cache.

Figure 6:
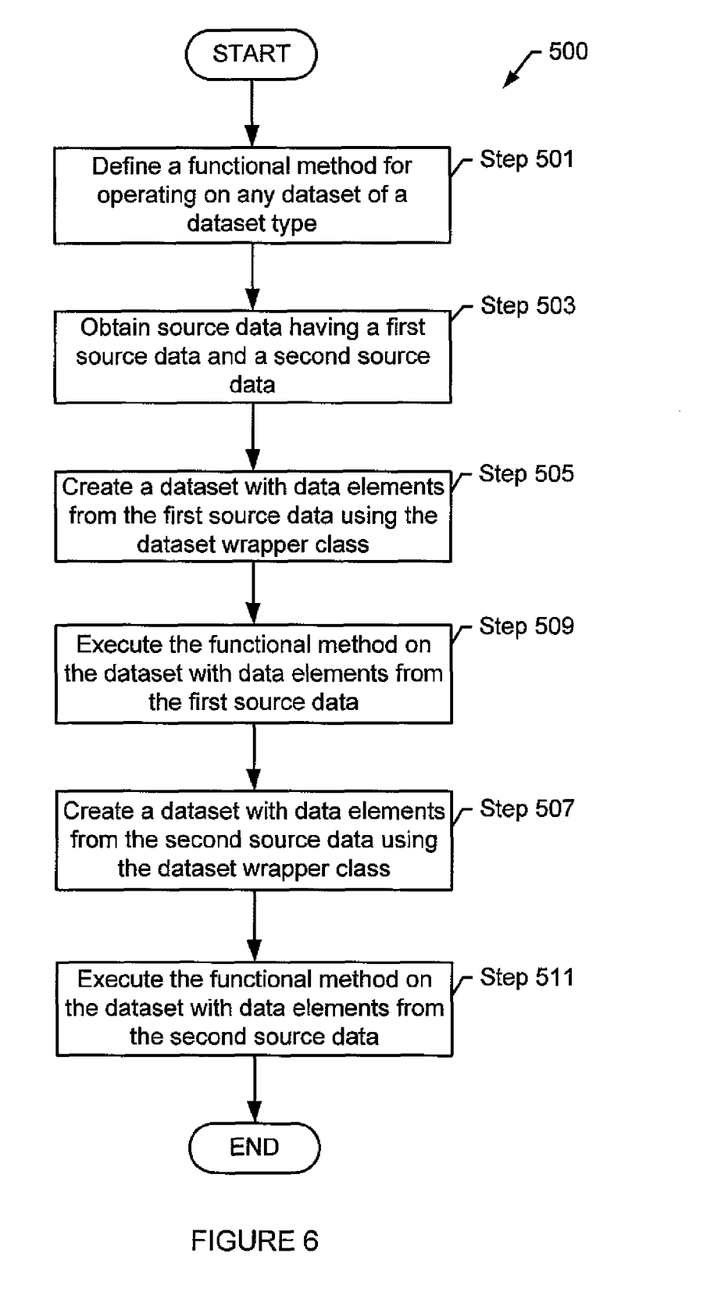
FIGS. 6 and 7A-B show flowcharts of a method of analyzing an oilfield, such as the oilfield depicted in FIGS. 1-3.
Figure 7A:
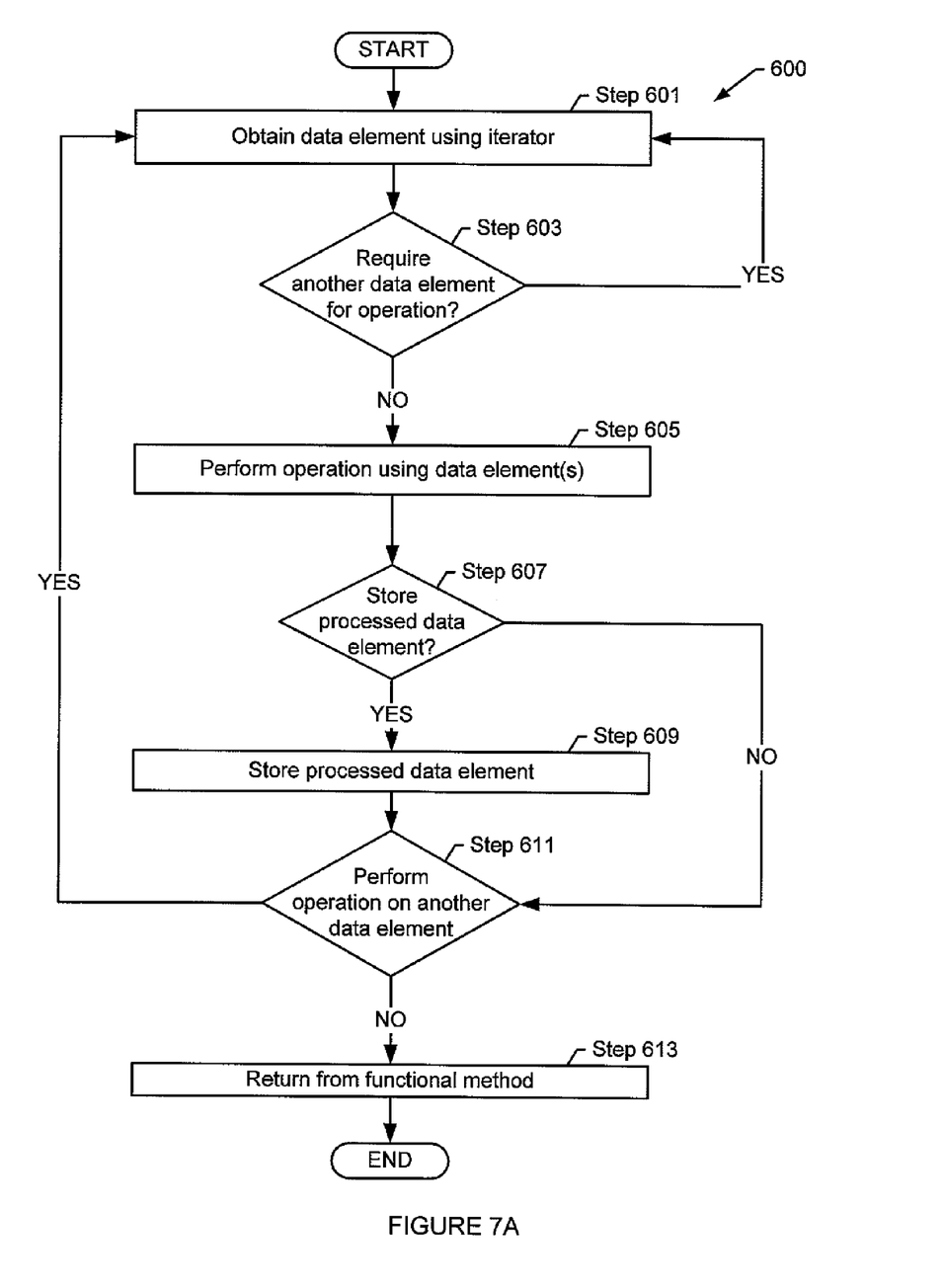
Figure 7B:
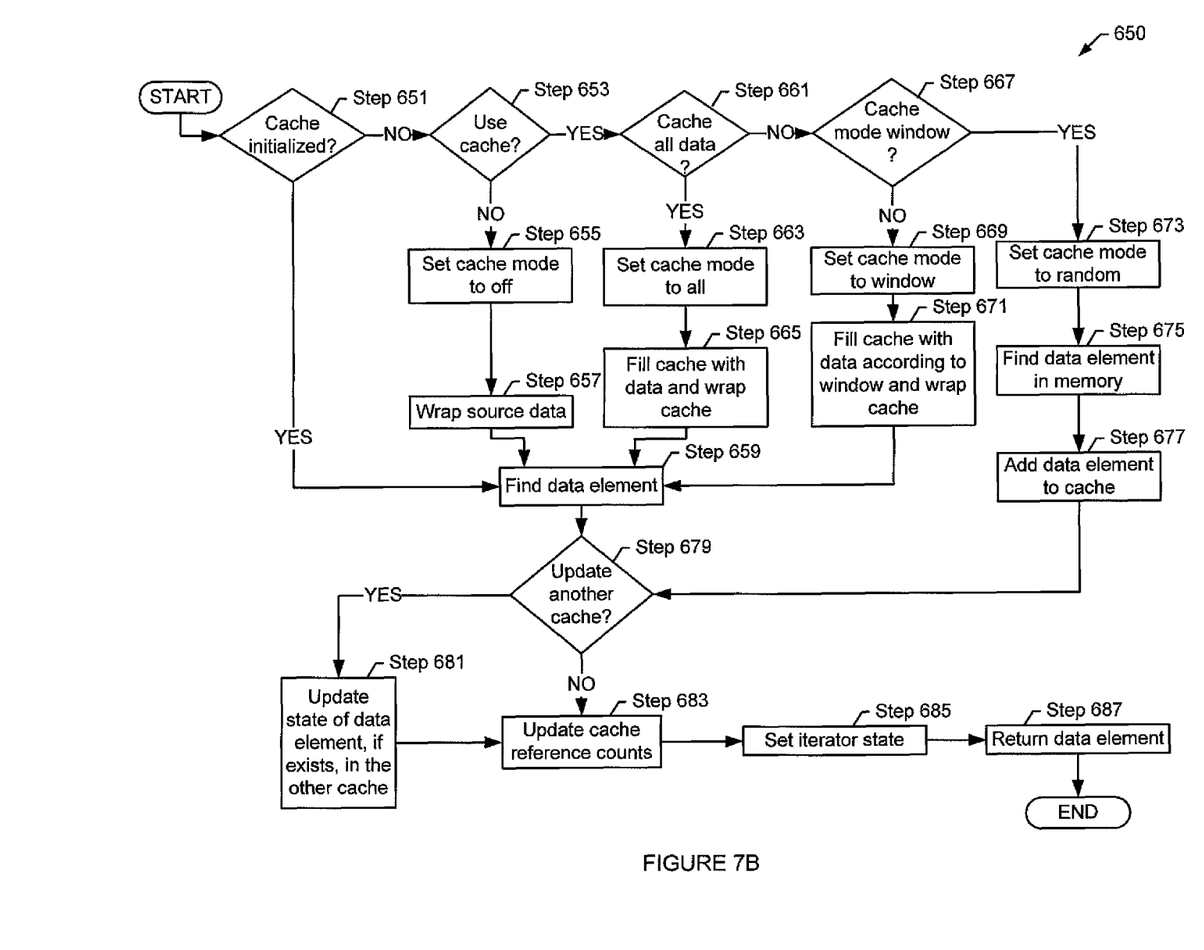

FIGS. 6 and 7A-B show flowcharts of a method of analyzing an oilfield, such as the oilfield depicted in FIGS. 1-3. While the various steps in this flowchart are presented and described sequentially, one of ordinary skill will appreciate that some or all of the steps may be executed in different orders and some or all of the steps may be executed in parallel. FIG. 6 shows a flowchart of a method (500) for analyzing, for example, an oilfield. Initially, a functional method for operating on any dataset of a dataset type is defined (Step 501). Defining the functional method is dependent on the type of function performed. For example, the functional method may be defined for performing a graphical operation on the dataset, interpreting the dataset, changing the coordinate system of the dataset, or performing any other operation that acts on a dataset. The functional method may be defined for a specific dataset type. Specifically, the interface for the functional method may require a single dataset type or may include logic for handling multiple different dataset types.

Further, source data having a first source data and a second client dataset is obtained (Step 503). A data collection means, such as a sensor or other such device may obtain data. Using interpolation on the data, a required data element may be generated from the data to populate the source data. Alternatively, the data may be sufficient to populate the entire source data. Each of the first source data and the second source data may be obtained sequentially, simultaneously, etc, Further, the first source data may represent different data from the second source data. For example, the first source data may represent a different geographic region, may correspond to a different type of data (e.g., seismic data and hydrologic data), etc.

Further, client code for operating on the dataset is created. For example, a developer may design the client code to create a visualization of seismic data. The object instantiation code may be defined within the client code to create the dataset object of the dataset type using the dataset wrapper class. Further, the object instantiation code or the functional method invocation code in the client code may use a casting operation to create the dataset type from the first source data when the dataset type of the source data and the dataset type are different. Alternatively, the functional method may have an interface for multiple, different data set types. In such scenario, a casting operation is not required by the client code. Next, the client code is compiled.

When executing the client code, a dataset with data elements from the first source data is created using the dataset wrapper class (Step 505). Specifically, memory is reserved when the object instantiation code is executed. Further, wrapping variables are associated with values which defines how the data set is obtained from the source data.

One the dataset is created, the instruction for the functional method invocation code may be executed. Accordingly, the functional method is executed on the dataset using data elements form the first source data (Step 509). Specifically, control is passed to the functional method which performs operations on the dataset. Because functional method operates on the dataset and the dataset wrapper class can hide the data type of the source data, then when the data type of the source data changes, the same functional method may be used without needing to be recompiled for each different dataset type.

Specifically, the client code may be modified or new client code created which uses the dataset wrapper class to define how to create the dataset from the second source data. For example, the object instantiation code may be redefined for the different type of source data. Thus, the client code can be recompiled for the different type of source data. However, the functional method does not require recompilation because of use of the dataset wrapper class by the functional method. Specifically, the dataset wrapper class hides the layout of the data to the functional method.

Similar to executing the client code on the first source data, a dataset is created with data elements from the second source data using the dataset wrapper class (Step 507). If the data type of the data elements in the first source data and the data type of the data elements in the second source data are heterogeneous, then the wrapping variables for the dataset may be different between the execution of the first source data and the second source data. For example, if the first source data is stored in memory in row major order and the second source data is stored in memory in column major order, then the offset vector of the wrapping variables may be different to reflect whether data elements in the rows or data elements in the columns are adjacent. However, the difference in the wrapping variables may be hidden from the functional method. Thus, the same functional method may be used in the client code.

Accordingly, the functional method is executed on the dataset with data elements from the second source data (Step 511). Executing the functional method may be performed as described below and in FIGS. 7A-7B. FIG. 7A shows a flowchart of a method (600) for processing the dataset from the perspective of instructions in the functional method. When executing the functional method a variety of instructions may be initially executed which do not use the dataset. For example, variables may be instantiated, other methods executed, etc. While executing, the functional method may have an operation which requires one or more data elements from the data set. When the functional method requires data element from the dataset, then the data element is obtained using the iterator (Step 601). For example, the functional method may have an instruction to obtain the next data element, the previous data element, a data element at a particular position, etc. Obtaining the next data element is described below and in FIG. 7B.

Continuing with FIG. 7A, a determination is made whether another data element is required for the operation in the functional method (Step 603). If another data element is required, then the other data element is obtained using the iterator (Step 601).

Once the data elements for the operation are obtained, then the operation is performed using the data element(s) (Step 605). The operation that is performed is functional method dependent. For example, the functional method may sum data elements in the dataset, store the values of the data elements in a temporary variable, perform transformation on the data elements, etc.

When performing the operation processed data elements may result. For example, if a transformation is performed on the data elements, then transformed data elements may result. When processed data elements result from the operation determination is made whether to store the processed data element into the dataset (Step 607). If a determination is made to store the processed data element in the dataset than the processed data element is stored (Step 609). Specifically, the iterator may be used to store the processed data element in a manner similar to obtaining the data element.

Regardless of whether the processed data element is stored, a determination may be made whether to perform an operation on another data element (Step 611). If another operation is to be performed, then a data element is obtained using the iterator (Step 601). Alternatively, the execution of the functional method may complete and the processing return to the client code from the functional method.

While not shown in FIG. 7A, one skilled in the art will appreciate that instructions may be performed at any time during the execution of the functional method which do not use the data elements. For example, loop initialization operations may be performed, variables in the functional method may be instantiated and manipulated, etc.

In some cases, multiple functional methods may be called according to the requirements of the application. For example, as discussed above, multiple classes within the client code may call functional method(s) on the object representing the dataset. Within the client code or using a functional method, output may be used to generate a visualization of the dataset. For example, the dataset may be displayed on the screen, such as a part of a model.

FIG. 7B shows a flowchart of a method (650) to obtain a data element using an iterator and the dataset wrapper class. Specifically, FIG. 7B shows a description of a possible sequence of instructions for obtaining the next data element, which may be executed by a central processing unit for processing a dataset. Initially, a determination is made whether the cache is initialized (Step 651). The cache may be considered initialized when memory is reserved for the cache, if required, and the cache mode is known. If the cache mode is off, then the cache may be considered initialized for the purpose of the description.

However, if the cache is not initialized, then a determination is made whether to use the cache (Step 653). Specifically, a determination is made whether to set the cache mode to off. The cache mode may be set to off, for example, if there are no transformations on the source data and the dataset can wrap the memory layout of the source data. The dataset may be able to wrap the source data when the wrapper variables may be used to describe how to obtain data elements directly from the source data.

If the determination is made not to use the cache, then the cache mode is set to off (Step 655). Specifically, a value for caching variable in the dataset object that identifies the cache mode may be changed to indicate that the cache mode is off. Further, the source data is wrapped (Step 657). When wrapping the source data, the parameters specified in the object instantiation code which use the constructor code may be used. For example, the values of the wrapping variables may be derived from the parameters and stored as a part of the object.

Once the source data is wrapped into the dataset, if the cache is not used, then the data element may be found from the dataset (Step 659). Finding the data element in the dataset may be performed according to the iterator that is defined in by the functional method. Specifically, the functional method may request from the dataset a forward iterator, bidirectional iterator, random iterator, etc. For example, if a forward iterator or bidirectional iterator is used, then the data element which is found is at the position of the iterator moved to the next adjacent data element. On the first access to the dataset, the forward and bidirectional iterator may reference the first data element in the dataset which may be specified by the data pointer wrapping variable.

A random access iterator may use as a parameter a position in the dataset that the functional method requires. The data element may be found by calculating the position in memory based on the position specified by the functional method in the dataset. For example, if the functional method requests the tenth data element in the dataset, then the wrapping variables may be used to determine where the tenth data element in the dataset exists in memory.

Continuing with FIG. 7B, if a determination is made to use the cache, then a determination is made whether to cache all of the data (Step 661). A determination may be made to cache all of the data when the size of the dataset is small. If a determination is made to cache all of the data, then the cache mode is set to all (Step 663). Further, the cache is filled with data and the cache is wrapped. The cache may be filled with source data or with data element in the dataset. If the cache is filled with source data, then the source data may be copied directly into the cache. However, if the cache is filled with data elements in the dataset, then parameters used in the object instantiation code to create the dataset may be used to determine how to create the data elements in the dataset from the source data. For example, if a Vertex2set dataset is to be created from a two double Vectors in which the first double Vector represents the first portion of the data elements in the Vertex2Set and the second double Vector represents the second portion of data elements in the Vertex2Set, then the cache may be filled with Vertex2 data elements by obtaining the first portion from the first double Vector and the second portion from the second double Vector for each data element. Further, when wrapping the cache, a set of wrapping variables may be used which describes how to obtain the data elements from the cache.

Once the cache is filled, then the data element may be found in the cache using the wrapping variables for the cache (Step 659). Finding the data element in the cache is dependent on the iterator used. Specifically, the wrapping variables may be used in conjunction with the iterator in a manner similar to using the wrapping variables to find a data element in memory (discussed above).

If a determination is made not to cache all data, then a determination is made whether the cache mode should be window (Step 667). The cache mode may be in window when the cache is needed and the size of the dataset is large such that not all data elements fit in memory. In such scenario, a window of data elements (i.e., a collection of adjacent data elements) may be stored in the cache. If a determination is made to set the cache mode to window, then the cache mode is set to window (Step 669).

Further, the cache is filled with data according to the window and the cache is wrapped (Step 671). The number of data elements in the window may be determined by the size of the cache and the size of the data elements in the cache. When filling the cache for the first time, the first data elements requested may be found from memory and placed in the cache with data elements up to the number of data elements that are adjacent to the first data element. For example, if n is the number of data elements and the first data element requested is the first data element in the data set, then the first n data elements may be used to fill the cache. In another example, if n is the number of data elements and the first data element requested is the middle data element of the dataset, then n/2 data elements before the requested data element and n/2 data elements after the requested data element may be stored in the cache. Accordingly, the requested data element is found (Step 659).

If the cache mode is not window, then the cache mode may be random. Thus, the cache mode is set to random (Step 673). Next, the data element is found in memory (Step 675). The data element may be found in memory using a random iterator as discussed above. Further, the data element is added to the cache (Step 677). When the data element is added to the cache, the data element may be stored in the cache with an identifier of the location of the data element within the dataset.

If, in step 651 a determination is made that the cache is initialized, then the data elements may be found using the cache (Step 659). Specifically, the cache mode is identified. If the cache mode is off, then the data elements are found in the wrapped source data in memory. If the cache mode is all, then the data elements may be found in the cache. If the cache mode is set to window, then a determination may be made whether the data element may be found in the cache. Specifically, a determination is made whether the position of the data element according to the iterator used is within the window which is covered by the cache. If the position of the data element is within the window, then the data element is obtained from the cache. If the position of the data element is not in the window, then the cache may be flushed, and a new window of data elements obtained from memory. Flushing the cache may include determining which data elements have changed and writing the data elements back to memory. The data elements may be written back to memory at this time, for example, if the cache is not write-through. Once the data elements are written back to memory, then any values in the cache may be deleted.

If a random iterator is used, then cache may be checked to determine whether the position of the data element is identified in the cache. If the position is identified, then the data element may be obtained from the cache. If the position is not identified, then the data element is obtained from memory. When the data element is found, the data element is added to the cache.

Once the data element is found, a determination is made whether the data element is to be updated or obtained (not shown). For example, the functional method may request writing the position of the data element. In such scenario, when the data element is found in the cache or in memory, then the value of the data element is updated according to the request of the functional method. Additionally, the cache may be marked to indicate that the value of the data element has changed. If the data element is to be obtained, then the value of the data element is read from memory.

Continuing with FIG. 7B, a determination is made whether to update another cache (Step 679). A determination may be made to update another cache if another cache exists and the data element is to be updated. Another cache may exist if the cache mode is random or window and another iterator is operating on the dataset. If another cache exists, then the state of the data element, if the data element exists in the cache, is updated. Specifically, the value of the data element may be updated or the data element may be marked as invalid.

Regardless of whether another cache is updated, the cache reference counts are updated (Step 683). Specifically, the cache usage statistics may be modified to reflect that a data element is accessed in the cache. Additionally, the iterator state is set (Step 685). Specifically, the iterator state is updated to reflect the location of the found data element. For example, a forward iterator may be incremented by one. A backward iterator may be decremented by one. A random iterator may be updated to reflect the location of the data element.

Further, the data element is returned (Step 687). The data element may be returned to the functional method when the functional method requests obtaining the data element. Rather than returning the data element, an indicator may be returned which indicates success when the functional method requests writing to the position of the data element.

The following example shows a possible method to generate a visualization of a dataset by retaining the transformed code. Specifically, the following is an example of client code.

```
1. MyView.h:
2.      class MyView2 { private: Vertex2Set transformed_points_; }
3. MyView.cpp:
4.      void MyView2::initPoints( )
        { transformed_points_.init(vertex2_array_);
5.      void MyView2::draw(UiGraphic& graphic) {
6.          transformed_points_.setTransform
            (graphic.getWorldToLogical ( ));
7.          transformed_points_.setCoordianteSystem
            (UiGraphic::getLogicalCSId( ));
8.          graphic.drawPoints(transformed_points_);
9.      }
```

As shown in the above example, the client code is composed of a header file (MyView.h (line 1)) and a source file (MyView.cpp (line 3)). MyView.h (line 1) includes object instantiation code of Vertex2Set transformed_points_ (line 2) to create an object "transformed_points_" of type Vertex2Set and an initialization call of initPoints (line 4) to initialize it with source data of a Vertex2 array. The initialization method is typically called when constructing the MyView object.

Continuing with the example, the source file may also have a draw method which includes a call to data manipulators setTransform and setCoordinateSystem which is defined in the dataset wrapper class. Specifically, the call to setTransform (line 6) transforms the values in the dataset to logical format from a world format. The call to setCoordinateSystem (line 7) changes the value of the coordinate system to indicate that the data elements in the cache are in logical format. In effect, the Dataset will administer a cache which corresponds to a transformation of the container array. The resulting cache may or may not be retained, e.g. depending on its calculation cost, memory consumption, usage history and whether or not the transformation changes. For example, if setTransform is called but the transformation is identical to the one already in the Dataset, then the cache within the dataset can be kept. Further, in the example, the Cache Releaser Class is unlikely to release the cache if it the cache has recently been in use.

Additionally, the draw method includes a call to a previously defined functional method, Graphic.drawPoints (line 8) which takes as a parameter a Vertex2Set. In the example, the call to Graphic.drawPoints corresponds to output generation code. When Graphic.drawPoints is executed, data elements in the cache may be iterated through from the cache and an image may be generated on a monitor or other such output device. Specifically, the Vertex2Set wrapper class hides from the Graphics.drawPoints the actual layout of the source data. Thus, for example, if the Vertex2Set is to be created from two double arrays, then only "void MyView2::initPoints( ){transformed_points_.init(vertex2_array_);" (line 4) is replaced with "void MyView2::initCachoPoints( ){transformed_points_.init (double_array, double_array);" to use a different constructor method defined in the Vertex2Set wrapper class. Specifically, graphics.drawPoints does not need to be modified because the data type of source data has changed. Rather, graphics.drawPoints may use the same iterator defined in the Vertex2Set wrapper class.

In the example, if another method exists that also requires transforming the Vertex2_array from world format to logical format, then the results may be obtained from the cache without further processing. Specifically, the method can use the same "transformed_points_" dataset instance.

The techniques described herein may be implemented on virtually any type of computer regardless of the platform being used. For example, a computer system includes a processor, associated memory, a storage device, and numerous other elements and functionalities typical of today's computers. The central processing unit (303) of FIG. 3 may use one or more of these items, in addition to the cooperating components shown in FIG. 3. The computer may also include input means, such as a keyboard and a mouse, and output means, such as a monitor. The computer system is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Advantages of the invention may include one or more of the following. In an aspect of the invention, a separation between algorithms defined in the client code and the dataset types is achieved. Specifically, the interface and the code for an algorithm may be defined and compiled only once and operate on multiple different dataset types and layouts on datasets.

Further, the number of lines of client code may be limited in some cases. Specifically, because the wrapper class performs the operation each element in the dataset, the client code may iterate through the entire dataset processing each element individually using a single line of code to the wrapper class Further, the number of lines of code may decrease, particularly in a large project. Specifically, the high level of data abstraction and the high level of code re-use may decrease the number of lines of code in both the algorithm code and the data managing code.

Additionally, optimization techniques may be exploited. For example, the optimization techniques may include executing the code on multiple processors and/or multiple processor cores.

With regards to caching, a cache may be used, when required or when useful for performance. In particular, optimization techniques, such as filling, flushing, and transforming the cache, may be performed for multiple applications by changing only the wrapper class and caching methods.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for analyzing an oilfield having at least one wellsite, each at least one wellsite having a wellbore penetrating a subterranean formation for extracting fluid from an underground reservoir therein, comprising:
   a data collection means for obtaining source data having a plurality of data elements of heterogeneous data types;
   a processor;
   memory for storing the obtained source data;
   a cache for temporarily storing data elements;
   functional method instructions stored on a computer readable storage medium configured for execution by the processor to perform a function on a dataset of a dataset type to obtain a processed dataset wherein a cache mode variable determines whether execution of the functional method instructions by the processor performs the function on data elements of the dataset temporarily stored in the cache; and
   client code instructions stored on a computer readable storage medium configured for execution by the processor to process a dataset, the client code instructions comprising:
      object instantiation code instructions configured to use dataset wrapper class instructions stored on a computer readable storage medium for execution by the processor to create the dataset with a dataset type from the obtained source data stored in the memory wherein the dataset wrapper class instructions comprise the cache mode variable that indicates whether data elements of at least a portion of the dataset are temporarily stored in the cache; and
      functional method invocation code instructions configured to call the functional method instructions with the dataset.

2. The system of claim 1, wherein the dataset wrapper class instructions comprise transform function instructions configured to transform the dataset.

3. The system of claim 1, wherein the dataset represents seismic data.

4. The system of claim 1, wherein the functional method instructions are further configured to create visualization data from the dataset.

5. The system of claim 1, wherein the dataset wrapper class instructions are configured to:
   identify a cache mode of the dataset indicating that data elements of at least a portion of the dataset are temporarily stored in the cache;
   obtain a data element of the dataset from the cache based on the cache mode and an iterator used by the functional method instructions; and
   return the data element of the dataset to the functional method instructions during execution of the functional method instructions by the processor.

6. The system of claim 5, wherein the iterator is one selected from a group consisting of a forward iterator, a backward iterator, a bidirectional iterator, and a random access iterator.

7. The system of claim 1, wherein the dataset wrapper class instructions are further configured to store the data elements of at least a portion of the dataset in a modified order in the cache.

8. The system of claim 1, wherein the dataset type defines, at least in part, the dataset wrapper class instructions for execution by the processor.

9. A method for analyzing an oilfield comprising:
   defining a functional method for operating on a dataset of a dataset type;
   obtaining source data from measurements of the oilfield, the source data having a first source data with data elements of a first data type and a second source data with data elements of a second data type;
   creating and storing in memory of a memory storage device a first object that represents the dataset with data elements from the first source data using a dataset wrapper class that reserves the memory for storing the first object and that comprises a cache mode variable for the data elements from the first source data wherein the creating comprises providing a value for the cache mode variable and wherein the storing comprises storing the value in the first object;
   analyzing the oilfield by executing the functional method on the first object stored in the memory that represents the dataset with data elements from the first source data wherein the executing comprises reading the value of the cache mode variable stored in the first object to determine whether at least some of the data elements from the first source data are temporarily stored in a cache;
   creating and storing in memory of the memory storage device a second object that represents the dataset with data elements from the second source data using a dataset wrapper class that reserves the memory for storing the second object and that comprises a cache mode variable for the data elements from the second source data wherein the creating comprises providing a value for the cache mode variable and wherein the storing comprises storing the value in the second object; and
   analyzing the oilfield by executing the functional method on the second object stored in the memory that represents the dataset with data elements from the second source data wherein the executing comprises reading the value of the cache mode variable stored in the second object to determine whether at least some of the data elements from the second source data are temporarily stored in a cache.

10. The method of claim 9, comprising temporarily storing at least some of the data elements from the first source data or at least some of the data elements from the second source data in a cache and transforming each of the data elements temporarily stored in the cache.

11. The method of claim 9, further comprising:
    identifying a cache mode of the first object that represents the dataset with data elements from the first source data indicating that at least some of the data elements from the first data source are temporarily stored in the cache;
    obtaining one of the data elements the cache based on the cache mode and an iterator used by the functional method; and
    returning the data element to the functional method.

12. The method of claim 9, wherein the functional method further comprises instructions for:
    storing the data elements from the first source data in a first modified order in a cache when creating and storing the first object that represents the dataset with the data elements from the first source data, wherein the dataset is processed from the cache after storing the plurality of data elements; and
    storing the data elements from the second source data in a second modified order in a cache when creating and storing the second object that represents the dataset with the data elements in the second source data, wherein the dataset is processed from the cache after storing the plurality of data elements.

13. The method of claim 9, wherein the dataset wrapper class is defined for the dataset type, and wherein the dataset wrapper class comprises a first instructor code for creating and storing the first object that represents the dataset with data elements from the first source data and a second constructor code for creating and storing the second object that represents the dataset with data elements from the second source data.

14. The method of claim 9, wherein the dataset represents seismic data.

15. The method of claim 9, wherein the functional method is configured to create a visualization of the dataset.

16. The method of claim 9 wherein executing the functional method uses an iterator and wherein the iterator is one selected from a group consisting of a forward iterator, a backward iterator, a bidirectional iterator, and a random access iterator.

17. A computer system comprising:
    a processor;
    memory coupled to the processor for storing source data having a plurality of data elements of heterogeneous data types;
    a cache for temporarily storing data elements;
    dataset wrapper class instructions stored on a computer readable storage medium and executable by the processor, the instructions comprising:
      object constructor code instructions configured to create a dataset of a dataset type from the source data; and
    client code instructions stored on a computer readable storage medium configured for execution by the processor to process the dataset, the instructions comprising:
      object instantiation code instructions configured for execution by the processor to use the object constructor code instructions to create the dataset and to provide a value for a cache mode variable for the dataset; and
      functional method invocation code instructions configured for execution by the processor to call functional method instructions stored on a computer readable storage medium with the dataset, for execution by the processor, to obtain processed data by accessing the memory, or the cache, based on the value of the cache mode variable.

18. The computer system of claim 17, wherein the dataset wrapper class instructions further comprises instructions for:

identifying a cache mode of the dataset indicating that data elements of at least a portion of the dataset are temporarily stored in the cache;

obtaining a data element of the dataset from the cache based on the cache mode and an iterator used by the functional method instructions; and returning the data element of the dataset to the functional method instructions during execution of the functional method instructions by the processor.

19. The computer system of claim 17, wherein the dataset wrapper class instructions further comprise instructions for:
storing data elements of the dataset in a modified order in a cache.

20. The computer system of claim 17, wherein the source data represents seismic data.

21. The computer system of claim 17, wherein the functional method instructions are configured to create visualization data from the dataset.

22. The computer system of claim 17, wherein the functional method instructions are configured to use an iterator defined by the dataset wrapper class instructions and wherein the iterator is one selected from a group consisting of a forward iterator, a backward iterator, a bidirectional iterator, and a random access iterator.

* * * * *